(12) United States Patent
Childs et al.

(10) Patent No.: US 6,847,884 B1
(45) Date of Patent: *Jan. 25, 2005

(54) PDA SYSTEM, METHOD AND DEVICE FOR LABELING THOROUGHFARES

(75) Inventors: Michael E. Childs, Overland Park, KS (US); Shane R. Runquist, Austin, TX (US)

(73) Assignee: Garmin Ltd. (KY)

( * ) Notice: Subject to any disclaimer, the term of this patent is extended or adjusted under 35 U.S.C. 154(b) by 109 days.

This patent is subject to a terminal disclaimer.

(21) Appl. No.: 10/271,959

(22) Filed: Oct. 15, 2002

Related U.S. Application Data

(63) Continuation-in-part of application No. 10/027,673, filed on Dec. 20, 2001, now Pat. No. 6,647,337.

(51) Int. Cl.[7] .......................... G01C 21/00; G01C 21/26
(52) U.S. Cl. ...................... 701/200; 701/208; 701/211; 701/24; 701/25; 73/178 R; 340/995.22; 340/995.23; 340/995.26; 340/995.27; 361/600
(58) Field of Search ................................ 701/200, 208, 701/211, 24, 25, 1; 73/178 R; 340/995.22, 995.23, 995.26, 995.27; 361/600, 682, 741, 756

(56) References Cited

U.S. PATENT DOCUMENTS

| | | | |
|---|---|---|---|
| 5,297,051 A | 3/1994 | Arakawa et al. ............ 364/449 |
| 5,528,248 A | 6/1996 | Steiner et al. .............. 342/357 |
| 5,543,789 A | 8/1996 | Behr et al. .................. 340/995 |
| 5,839,086 A | 11/1998 | Hirano ........................ 701/201 |
| 5,925,090 A | 7/1999 | Poonsaengsathit .......... 701/211 |
| 5,938,721 A | 8/1999 | Dussell et al. .............. 701/211 |
| 5,991,690 A | 11/1999 | Murphy ....................... 701/211 |
| 6,081,803 A | 6/2000 | Ashby et al. .................. 707/4 |
| 6,092,076 A | 7/2000 | McDonough et al. ....... 707/102 |
| 6,184,823 B1 | 2/2001 | Smith .................... 342/357.13 |
| 6,188,955 B1 | 2/2001 | Robinson et al. ........... 701/200 |
| 6,188,956 B1 | 2/2001 | Walters ...................... 701/200 |
| 6,249,742 B1 | 6/2001 | Friederich et al. .......... 701/202 |
| 6,266,612 B1 | 7/2001 | Dussell et al. .............. 701/207 |
| 6,317,684 B1 | 11/2001 | Roeseler ..................... 701/202 |
| 6,317,687 B1 | 11/2001 | Morimoto et al. .......... 701/211 |
| 6,321,158 B1 * | 11/2001 | DeLorme et al. ........... 701/201 |
| 6,330,453 B1 | 12/2001 | Suzuki et al. ............... 455/456 |
| 6,411,899 B2 | 6/2002 | Dussell et al. .............. 701/211 |
| 6,538,880 B1 * | 3/2003 | Kamijo et al. .............. 361/686 |
| 6,542,820 B2 * | 4/2003 | LaMance et al. ........... 701/213 |
| 6,640,106 B2 * | 10/2003 | Gutowski et al. ........ 445/456.1 |
| 6,647,337 B1 * | 11/2003 | Childs et al. ............... 701/208 |

OTHER PUBLICATIONS

"An optimal pathfinder for vehicles in real–world digital terain maps", http://www./nease.net/jamsoft/shortestpath/pathfinder/4.html, (1999),11 pages.

"Informed Search Methods", *Artificial Intelligence, A Modern Approach*, Prentice Hall, Inc., (1995),92–115.

"Real–Time Vehicle Routing in Dynamic and Stochastic Urban Traffic Networks", http://www.gpu.srv.ualberta.ca/lfu/research.ht, (1997),1–3.

(List continued on next page.)

*Primary Examiner*—Thomas G. Black
*Assistant Examiner*—Olga Hernandez
(74) *Attorney, Agent, or Firm*—Devon A. Rolf

(57) ABSTRACT

A name of a thoroughfare is identified from at least one name for the thoroughfare in reference to a set of criteria. In one example, the set of criteria includes whether or not the thoroughfare is an interstate, whether or not a name is shielded, has a suffix, and/or has an identified prefix. Interstate thoroughfares are often identified by a shielded name of the interstate thoroughfare, and non-interstate thoroughfares are often identified by a non-shielded name of the non-interstate thoroughfare. The identified name includes a name which is most recognized or well-known for navigating.

31 Claims, 9 Drawing Sheets

OTHER PUBLICATIONS

Ahuja, R., "Faster Algorithms for the Shortest Path Problem", *Journal of the Association for Computing Machinery*, *37*(2), (1990),pp. 213–223.

Cung, V., et al., "An Efficient Implementation of Parallel A*", *CFPAR*, Montreal, Canada, (1994),pp. 153–167.

Fredman, M., "Fibonacci heaps and their uses in improved network optimization algorithms", *Journal of ACM*, (1987),2 pages.

Fu, L., "Heuristic Shortest Path Algorithms and their Potential IVHS Applications", *Proceedings of the 4th University of Alberta—University of Calgary, Joint Graduate Student Symposium in Transportation Engineering*, (1995),pp. 83–109.

Ikeda, T., "A Fast Algorithm for Finding Better Routes By AI Search Techniques", *Vehicle Navigation and Information Systems Conference Proceedings*, (1994),pp. 291–296.

Kaindl, H., "Memory–Bounded Bidirectional Search", *Proceedings of the 12th National Conference on Art*, AAAI Press, Seattle WA, (1994),pp. 1359–1364.

Laporte, G., "The Vehicle Routing Problem: An Overview of Exact and Approximate Algorithms", *European Journal of Operational Research*, *59*, (1992),pp. 345–358.

Myers, B., "Data Structures for Best–First Search", http://www.4.ncsu.edu/jbmyers/dsai.htm, (1997),pp.1–6.

Ronngren, R., et al., "Parallel and Sequential Priority Queue Algorithms", *ACM Transactions on Modeling and Computer Simulation*, (1997),pp. 168–172, 198,199.

Stout, B., "Smart Moves: Intelligent Pathfinding", *Gamasutra* http://gamasutra.com/features/prgramming/080197/pathfinding.htm. (1997),pp. 1–11.

Wai, Leong.H., et al., "Comparative Study of Shortest Path Algorithm for Transport Network", *USRP Report 2*, (1999), pp. 1–10.

Zhan, F., "Three Fastest Shortest Path Algorithms on Real Road Networks: Data Structures and Procedures", *Journal of Geographic Information and Decision Analysis*, (1997), 11 pages.

Zhao, Y., "An Adaptive Route–Guidance Algorithm for Intelligent Vehicle Highway Systems", *American Control Conference*, Boston, MA,(1991),pp. 2568–2573.

* cited by examiner

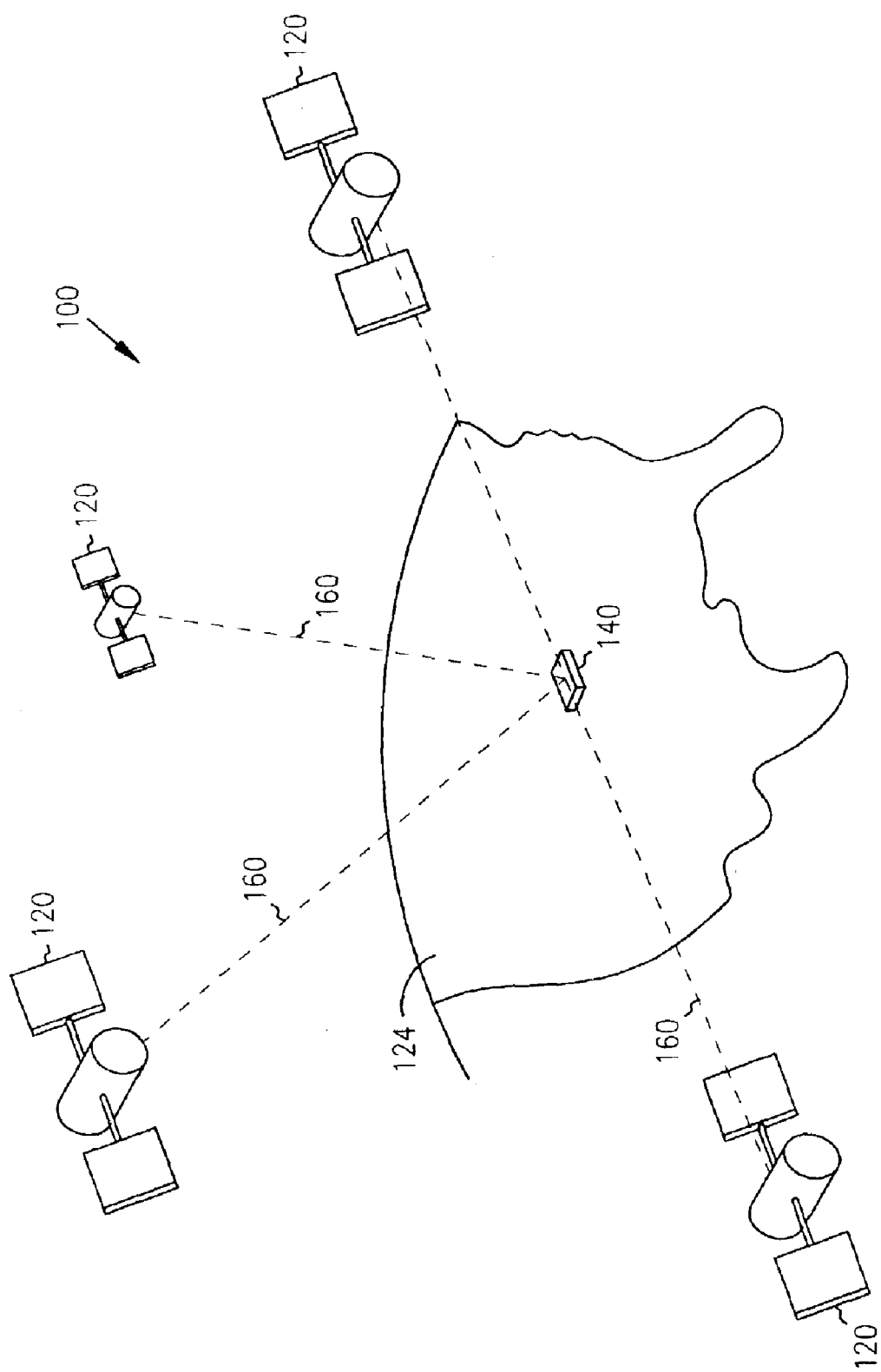

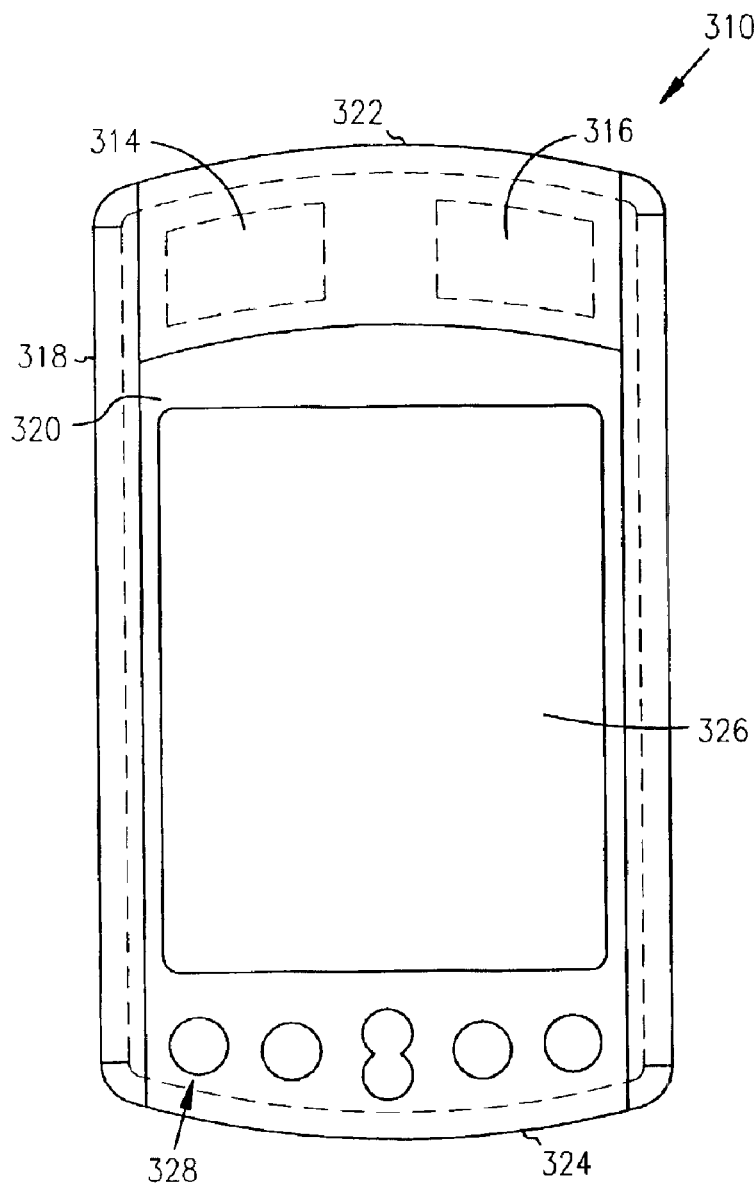
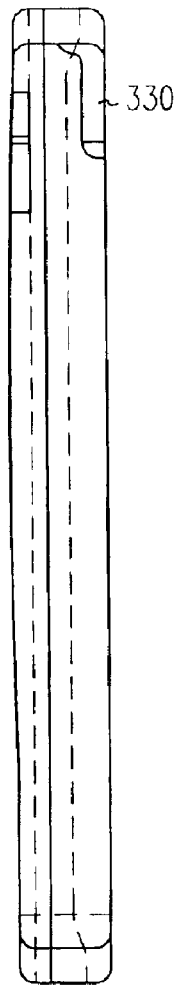
FIG. 3A
FIG. 3B
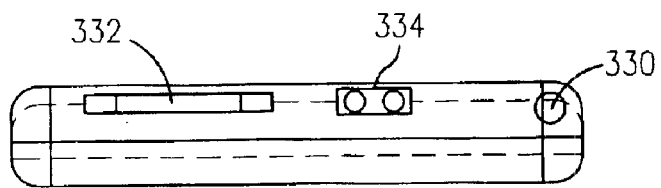
FIG. 3C

PDA SYSTEM, METHOD AND DEVICE FOR LABELING THOROUGHFARES

CROSS REFERENCE TO RELATED APPLICATIONS

This application is a continuation-part to U.S. application Ser. No. 10/027,673, filed Dec. 20, 2001, now U.S. Pat. No. 6,647,337, patented on Nov. 11, 2003, the specification of which is incorporated herein by reference.

FIELD OF THE INVENTION

The present invention relates generally to PDA devices, and in particular PDA systems, methods and devices for labeling thoroughfares.

BACKGROUND OF THE INVENTION

Route planning devices are well known in the field of navigational instruments. The method of route planning implemented by known prior art systems depends on the capabilities of system resources, such as processor speed and the amount and speed of memory. As increased system capability also increases system cost, the method of route planning implemented by a navigation device is a function of overall system cost.

One feature of increased system capability cost involves the labeling of thoroughfares with a best name, or a most well-known name. Thoroughfare names are either shielded or not shielded. A shielded thoroughfare name is one that appears on signs along thoroughfares inside of a symbol rather than merely being spelled out. Examples of shielded name includes US1, I270, or State 91. A non-shielded name is a name for a thoroughfare that is not typically displayed in a symbol on signs, such as "Jeff Davis Highway" or "Jack Nicklaus Freeway." Some thoroughfares have multiple names, some of which may be shielded and some of which may be non-shielded name, for example, "Jeff Davis Highway" in Virginia is a non-shielded name for the same thoroughfare whose shielded name is "US1."

In general, thoroughfares are better known by their non-shielded name, except for interstate thoroughfares. For example, highway US1 is more well known by the non-shielded name of "Jeff Davis Highway." In contrast, the I635 interstate beltway around Kansas City, Kans. is not very well-known by it's non-shielded name of the "Harry S. Darby" freeway.

Furthermore, conventional cartographic displays in navigational instruments frequently do not display the well-known non-shielded name of a thoroughfare. For example, conventional systems display the name "US1" on the display as a label for the thoroughfare that is better-known as the "Jeff Davis Highway."

The frequent use of less-than-well-known thoroughfare names creates problems for the users of the cartographic data from navigation devices. Thoroughfare signs more frequently than not, identify thoroughfares using the better-known names of the thoroughfares. As a result, the names on the thoroughfare signs can be different than the name provided by the navigation device. When the names are different, the user may not correctly identify the thoroughfare while in route, and may travel past, or miss the intended course of navigation.

Additionally, thoroughfare names often have a suffix, such as "business" or "alternate." For example, "I-44 business" in Rolla, Mo., designates a portion or spur of I-44 that services a business district of a city that is also known by the non-shielded name of "US63.". An exception to the above rule in which interstates are most well-known by the shielded name is that interstates with a suffix are better known by their non-shielded name. Therefore, "I-44 business" is better-known as "US63."

In summary, conventional systems often communicate a label to a navigational device with is a lesser-known name, or a nearly unknown name. Furthermore, conventional systems do not necessarily label a thoroughfare on a cartographic display of a navigational device with a better-known, or the best-known, name of the thoroughfare. Therefore, there exists a need for systems, methods, data structures, and apparatus adapted to communicate a label of a thoroughfare through an output of a navigational device with a better-known name, a well-known name, or the best-known name, of the thoroughfare.

SUMMARY OF THE INVENTION

The above mentioned problems of navigational devices are addressed by the present invention and will be understood by reading and studying the following specification. Systems and methods are provided to allow a better-known name, a well-known name, or the best-known name, to identify thoroughfares in cartographic data. The systems and methods of the present invention offer an improved navigational device which has a cartographic display with thoroughfare labels that correspond to the well-known name of the thoroughfare, which in turn, more accurately, efficiently, and understandably assists in navigation.

In some embodiments, a well-known name, a better-known name, and/or a most appropriate name in a given context of a thoroughfare is selected as the label name of the thoroughfare in cartographic data. One example of a well-known name is a non-shielded name. Where the thoroughfare is not an interstate, the first non-shielded thoroughfare name in a set of thoroughfare labels is identified and/or selected as the name of the thoroughfare. The same holds true if the thoroughfare is an interstate and the name for the interstate has a suffix.

In another embodiment, an electronic navigational aid device that identifies a name of a thoroughfare includes a memory and a processor. The memory includes a list of one or more names of the thoroughfare, and the shield types, if any, of the names of the thoroughfare. The processor is adapted to communicate with the memory. The processor obtains the list of names of the thoroughfare, and the shield types, if any, of the name(s) of the thoroughfare. The most well-known name of the thoroughfare is selected from the list for labeling the thoroughfare.

The present invention has the advantage of using a better-known name for a thoroughfare in cartographic data. This is helpful to a human user of the cartographic data when the cartographic data is used or relied upon by the user in navigating thoroughfares.

Those, as well as other novel advantages, details, embodiments, and features of the present invention, will be apparent to those skilled in the art from the following detailed description of the invention, the attached claims and accompanying drawings, listed herein below, which are useful in explaining the invention.

BRIEF DESCRIPTION OF THE DRAWINGS

FIG. 1 is a representative view of a Global Positioning System (GPS);

FIGS. 3A–3C illustrate views for another embodiment of an electronic navigational device according to the teachings of the present invention;

DETAILED DESCRIPTION OF THE INVENTION

Figure 2A:
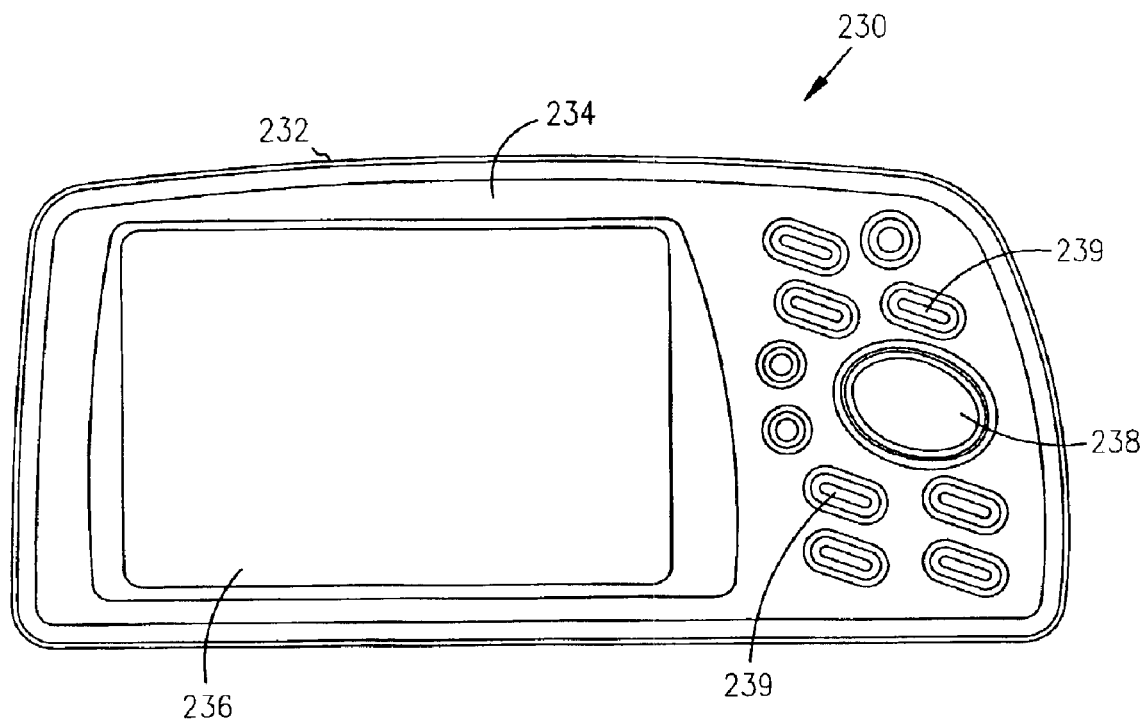
FIGS. 2A and 2B illustrate views for one embodiment of an electronic navigational device according to the teachings of the present invention.

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having improved thoroughfare labels that correspond to the well-known name of the thoroughfare, which in turn, more accurately, efficiently, and understandably assists in navigation. One type of navigational system includes Global Positioning Systems (GPS). Such systems are known and have a variety of uses. In general, GPS is a satellite-based radio navigation system capable of determining continuous position and velocity information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometric triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2B:
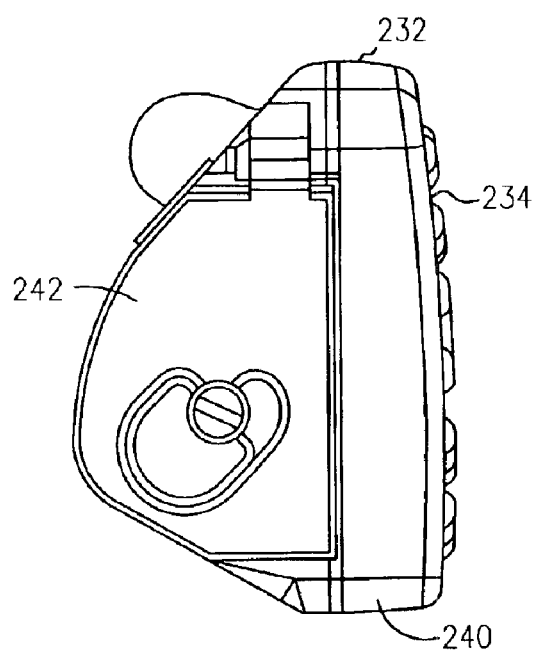

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited. Audio information can likewise be provided in one embodiment.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the device housing 232 and support input key pad 238, other individual keys 239, and display screen 236 in respective access slots shown in the control face 234 of FIG. 2A.

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. In one embodiment of the present invention, GPS integrated PDA 310 includes a conventional PDA device as illustrated such as a Palm Pilot® made by 3Com. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

According to embodiments of the invention, the GPS integrated PDA 310 includes a calendar function and an address book function. In some embodiments the GPS integrated PDA 310 includes a to do list function. In some embodiments the GPS integrated PDA 310 includes a graffiti function. In some embodiments the GPS integrated PDA 310 includes a date book function. In some embodiments the GPS integrated PDA 310 includes a calculator function. In some embodiments the GPS integrated PDA 310 includes a memo pad or note pad function.

It should be understood that the structure of GPS integrated PDA 310 is shown as illustrative of one type of integrated PDA navigation device. Other physical structures, such as a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
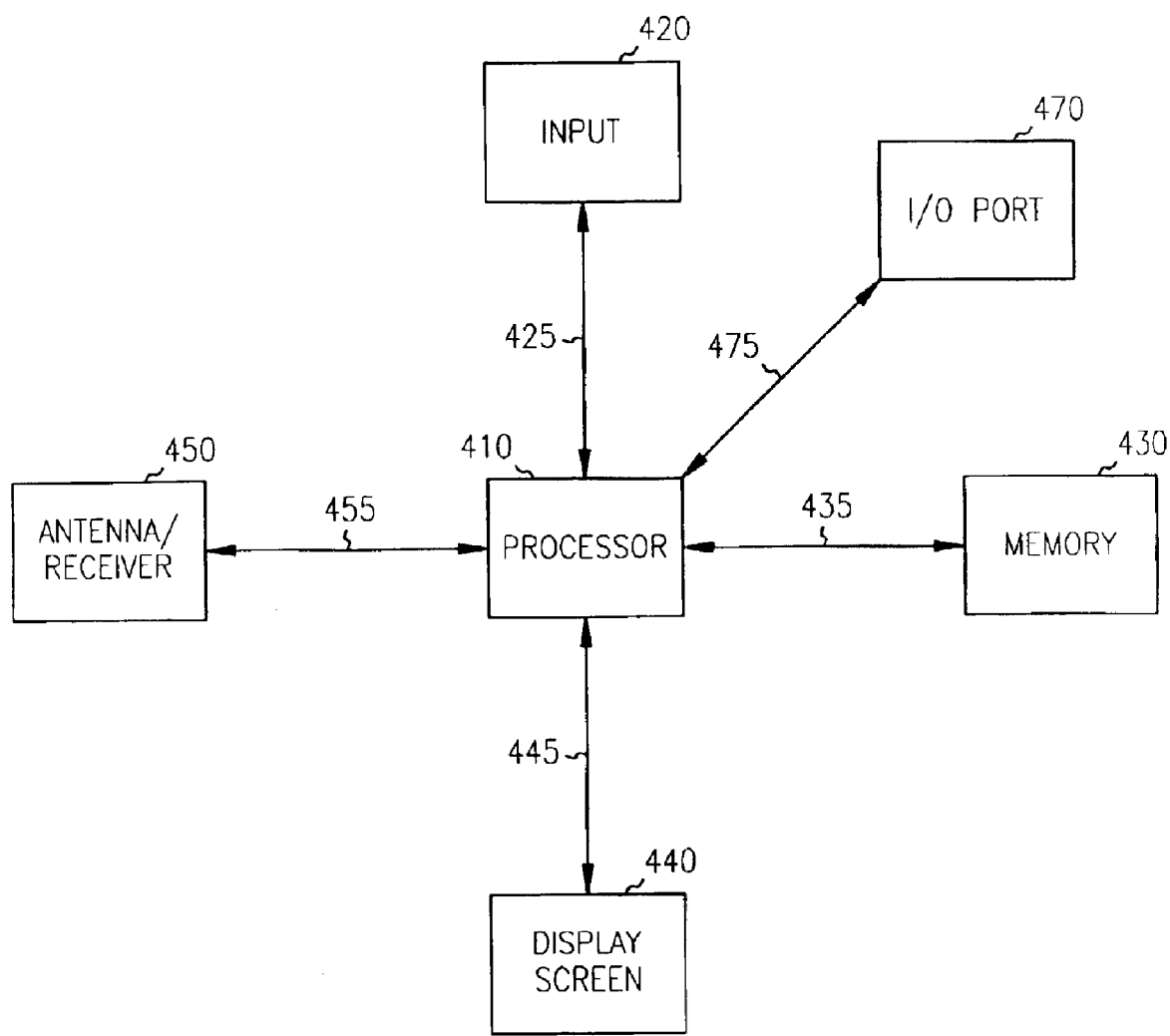
FIG. 4A is a block diagram of one embodiment for the electronic components within the hardware of FIGS. 2A–2B according to the teachings of the present invention.

FIG. 4A is a block diagram of one embodiment for the electronic components within the hardware of FIGS. 2A–2B, such as within housing 232 and utilized by the electronic navigational device. In the embodiment shown in FIG. 4A, the electronic components include a processor 410 which is connected to input, such as keypad 420 via line 425. Processor 410 communicates with memory 430 via line 435. Processor 410 also communicates with display screen 440 via line 445. An antenna/receiver 450, such as a GPS antenna/receiver is connected to processor 410 via line 455. The electronic components further include I/O ports 470 connected to processor 410 via line 475.

Figure 4B:
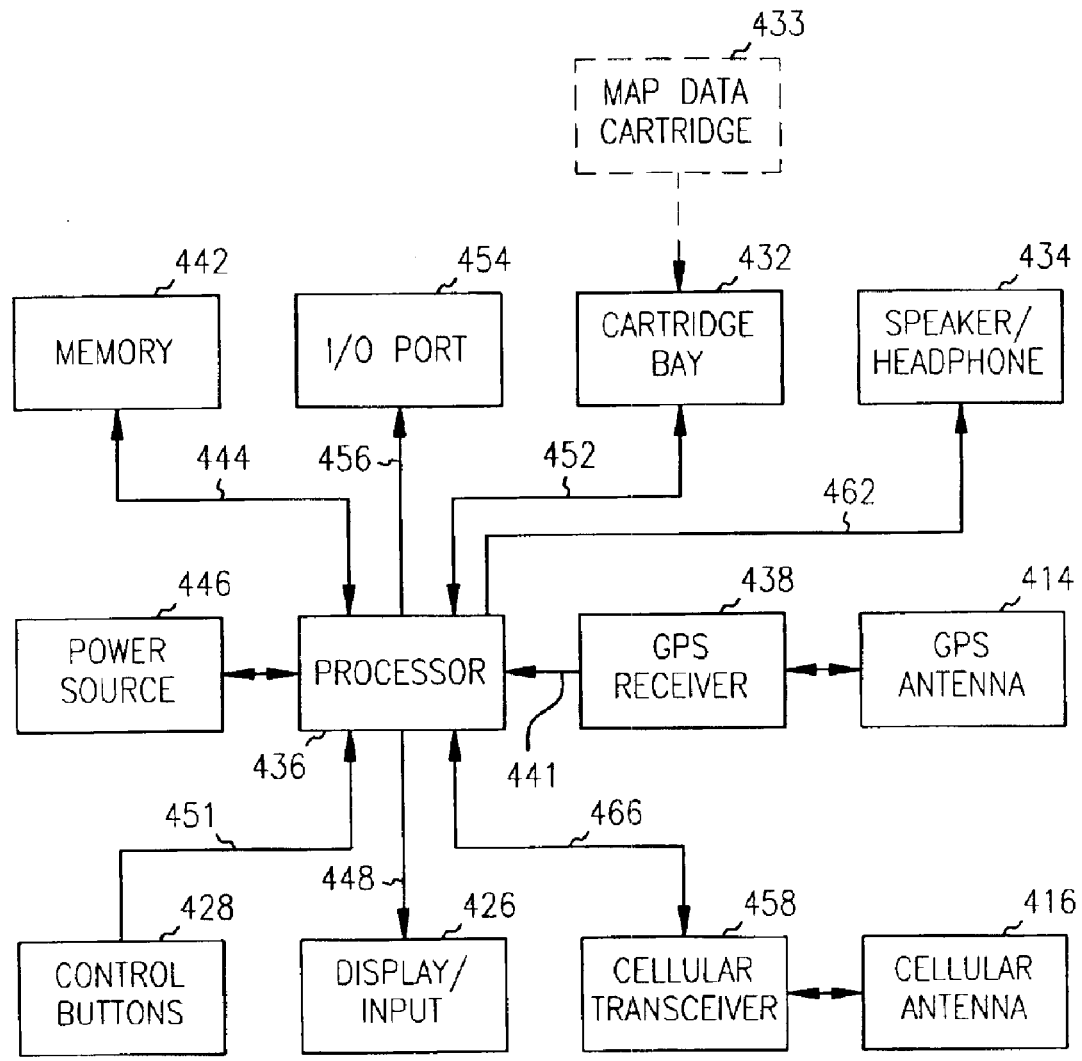
FIG. 4B is a block diagram of one embodiment for the electronic components within the hardware of FIGS. 3A–3C according to the teachings of the present invention.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system such as PalmOS that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

According to the teachings of the present invention, the electronic components embodied in FIGS. 4A and 4B are adapted to provide an electronic navigational device with improved thoroughfare labels that correspond to the well-known name of the thoroughfare, which in turn, more accurately, efficiently, and understandably assists in navigation. That is, according to the teachings of the present invention a processor 410 in FIG. 4A and a processor 436 in FIG. 4B are provided with the electronic navigational aid device. A memory 430 in FIG. 4A and a memory 442 in FIG. 4B are adapted to communicate with the processor. The memory 430 in FIG. 4A and memory 442 in FIG. 4B includes cartographic data, a list of one or more name(s) of a thoroughfare, and a type of the shield of each of the name(s), if any, of the thoroughfare stored therein. A display 440 is adapted to communicate with the processor 410 and is capable of displaying the cartographic data and one of the name(s) in FIG. 4A. When the one name is displayed with the cartographic data, the names serves as a label. The electronic navigational aid device processes name and shield types using a set of processing algorithms and the cartographic data stored in memory to operate on signals, e.g. GPS signals, received from the antenna/receiver 450 as the same will be known and understood by one of ordinary skill in the art upon reading this disclosure.

Using the processing algorithms of the present invention, the device identifies a best, or most well-known name for a thoroughfare. In some embodiments, the device obtains characteristics of the thoroughfare, such as, alternative name (s), if any, and associated shield types, if any, for the alternative name(s) of the thoroughfare from the memory 430 if FIG. 4A and the memory 442 in FIG. 4B. The device is able to select the most well-known name from the plurality of names associated with the thoroughfare using characteristics such as the text in the name and optionally, the shield type of each name. Thus, the device solves the problem in conventional systems of labeling a thoroughfare in cartographic data of a navigational device with a lesser-known, or a nearly unknown name.

In some embodiments, the type of the name of the thoroughfare is selected from the group consisting of a shielded type and non-shielded type. According to the teachings of the present invention, the device incorporates these and other functions as will be explained in more detail below in connection with FIGS. 6–9.

In some embodiments, the processor selects a name from a plurality of names associated with the thoroughfare. The name is adapted to be communicated as the label on the cartographic display of the device. In one embodiment, the plurality of names are sorted in the order of their extent or degree of renown, in which the most renowned name is at the beginning of the list. The processor obtains a next name from the plurality of thoroughfare names, and while the plurality of thoroughfares is not exhausted, obtaining a next name is iteratively performed until the plurality of thoroughfare names is exhausted and the best, or most well-known name is selected.

In another embodiment, the processor further communicates the best, or most well-known name to an output device, such as a display 440, as shown in FIG. 4A. In FIG. 4A, the output device, such as display 440, is in communication with the processor 410 and the memory 430. Another embodiment of the output device is a voice synthesis unit (not shown) According to the teachings of the present invention, the device incorporates these and other functions as will be explained in more detail below in connection with FIGS. 6–9.

Figure 5:
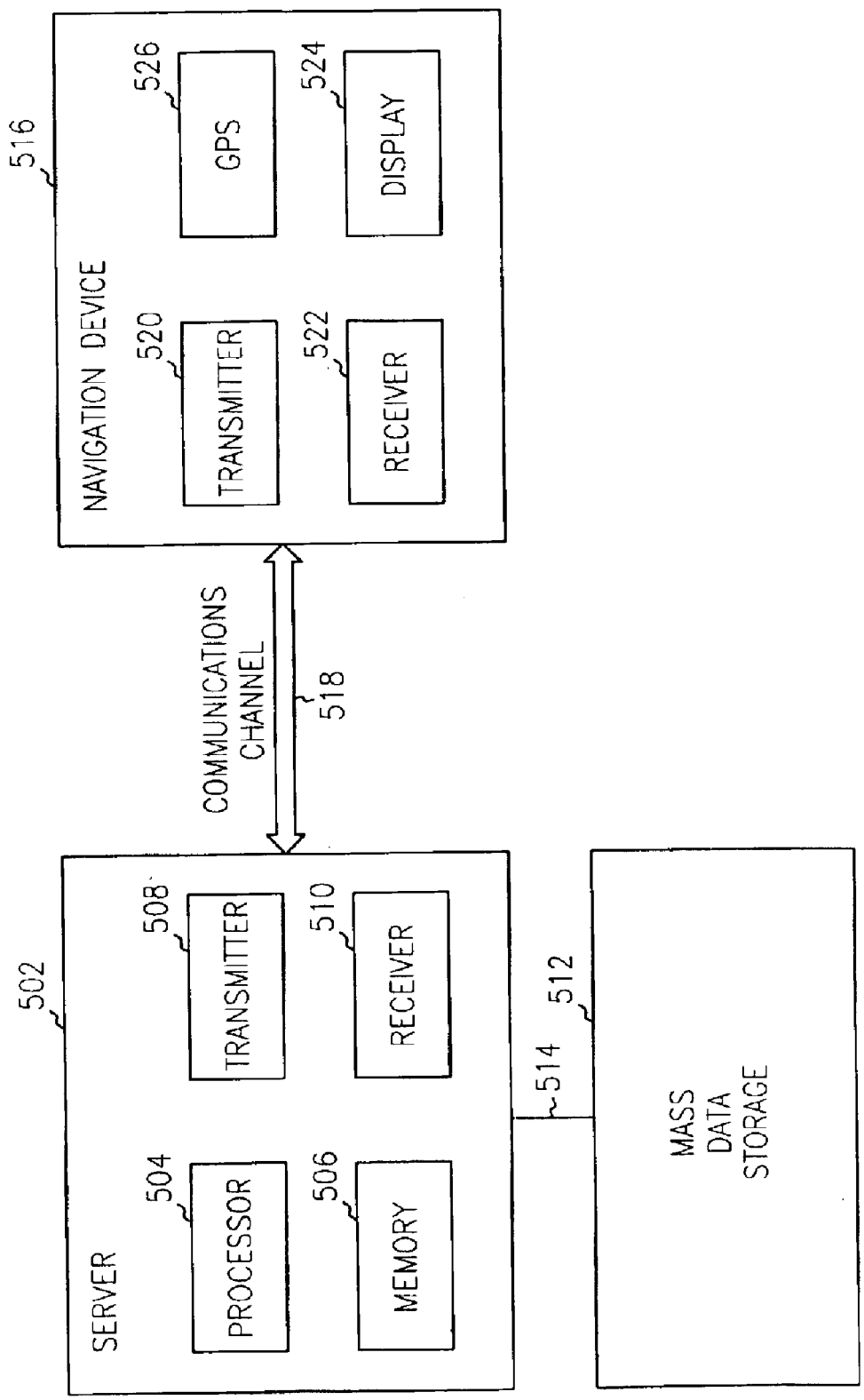
FIG. 5 is a block diagram of a navigation system according to the teachings of the present invention.

FIG. 5 is a block diagram of an embodiment of a navigation system which can be adapted to the teachings of the present invention. The navigation system includes a server 502. According to one embodiment, the server 502 includes a processor 504 operably coupled to memory 506, and further includes a transmitter 508 and a receiver 510 to send and receive data, communication, and/or other propagated signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be separate device from the server 502 or can be incorporated into the server 502.

In one embodiment of the present invention, the navigation system further includes a navigation device 516 adapted to communicate with the server 502 through the communication channel 518. According to one embodiment, the navigation device 516 includes a processor and memory 506, as previously shown and described with respect to the block diagrams of FIGS. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

FIG. 5 presents yet another embodiment for a collective set of electronic components adapted to the present invention. As one of ordinary skill in the art will understand upon reading and comprehending this disclosure the navigation system of FIG. 5 is adapted to the present invention in a manner distinguishable from that described and explained in detail in connection with FIGS. 4A and 4B.

That is, the navigational system 500 of FIG. 5 is likewise adapted to provide an electronic navigational aid device 516 with improved thoroughfare labels that correspond to a well-known name of the thoroughfare, which in turn, more accurately, efficiently, and understandably assists in navigation. In this embodiment, the processor 504 in the server 502 is used to handle the bulk of the system's processing needs. And as one of ordinary skill in the art will understand the mass storage device 512 that is adapted to communicate with the server can include volumes more cartographic and route data than that which is able to be maintained on the navigational device 516 itself. In this embodiment, the server 502 processes the majority of selecting thoroughfare names using a set of processing algorithms and the cartographic and route data stored in memory 512 and can operate on signals, e.g. GPS signals, originally received by the navigational device 516. Similar to the navigational device of FIGS. 4A and 4B, the navigation device 516 in system 500 is outfitted with a display 524, and GPS capabilities 526. In some embodiments, the output device is a voice synthesis unit. In some embodiments, the output device is a combination of a display 524 and a voice synthesis unit.

As described and explained in detail in connection with FIGS. 4A and 4B, the navigation system of FIG. 5 uses processing algorithms to obtain a well-known name of a thoroughfare. The processor 504 operates on algorithms and the cartographic data and thoroughfare label data that includes data indicative of a well-known name for a thoroughfare associated with the cartographic data stored in memory 506. Using the novel processing algorithms and the cartographic data and thoroughfare label data stored in memory 506, the navigation device 516 obtains a well-known name in reference to the shield type of the name. In some embodiments, the type of the name of the thoroughfare is selected from a group of types consisting of a shielded type and a non-shielded type, and/or selected from a group of types consisting of an interstate and a non-interstate type.

As described in connection with FIGS. 4A and 4B, the navigation device 516 incorporates these and other functions as will be explained in more detail below in connection with FIGS. 6–9. The invention however, is not so limited. The navigation device 516 of the present invention includes a portable electronic navigational aid device. In some embodiments, the portable electronic navigational aid device is a personal digital assistant (PDA). In some embodiments, the portable electronic navigational aid device is a wireless communications device.

The system can further operate on signals, e.g. GPS signals, originally received by the navigational device 516. Similar to the navigational device of FIGS. 4A and 4B, the navigation device 516 in system 500 is outfitted with a display 524 and GPS capabilities 526. As one of ordinary skill in the art will understand upon reading and comprehending this disclosure, a user of the navigation device 516 can be proximate to or accompanying the navigation device 516. The invention however, is not so limited. The features and functionality explained and described in detail above in connection with the device of FIGS. 4A and 4B are likewise available in the system 500 of FIG. 5.

The features and functionality explained and described in detail above in connection with the device of FIGS. 4A and 4B are likewise available in the system 500 of FIG. 5. That is, as will be explained in more detail below, in one embodiment the navigation device 516 further provides improved thoroughfare labels that correspond to the well-known name of the thoroughfare, which in turn, more accurately, efficiently, and understandably assists in navigation.

Figure 6:
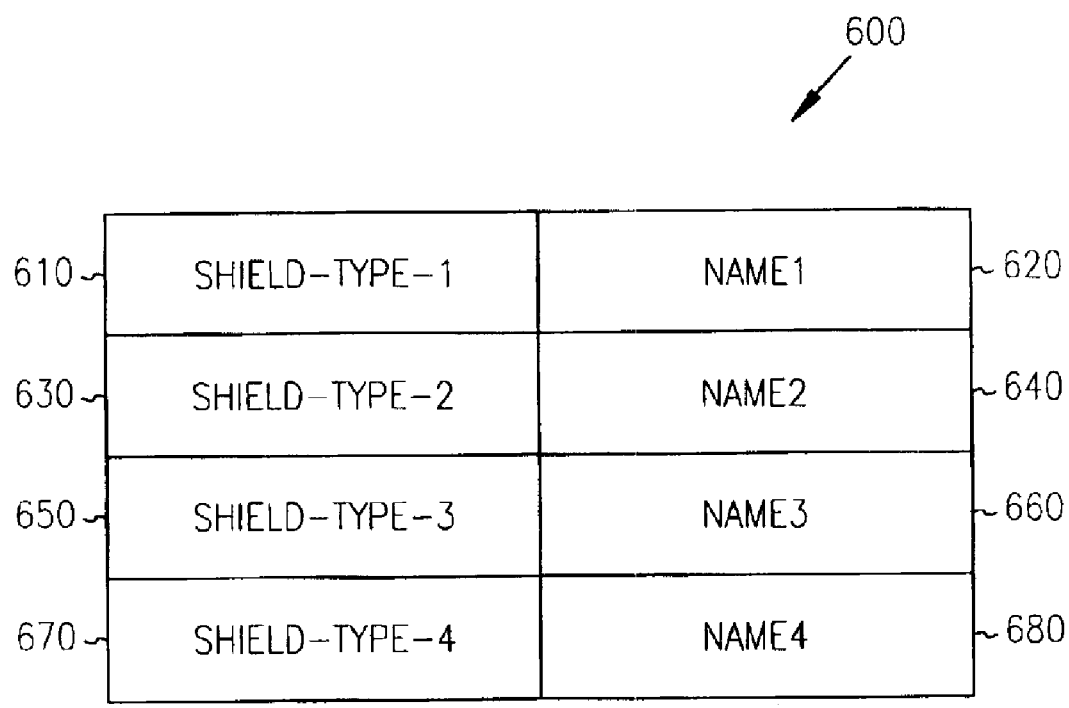
FIG. 6 is a block diagram of a data structure that represents a plurality of names of a thoroughfare, and optionally, a shield type of each of the names, according to an embodiment of the invention.

FIG. 6 is a block diagram of a data structure 600 that represents a plurality of names of a thoroughfare, and optionally, a shield type of each of the names, according to an embodiment of the invention. One instance of data structure 600 is implemented for one thoroughfare.

Data structure 600 includes at least one representation of a non-shielded name of the thoroughfare. In some embodiments, data structure 600 includes four names, name1 in block 620, name2 in block 640, name3 in block 660, and name4 in block 680. In some embodiments, the representations of names are character strings.

In some embodiments, the first name, name1 in block 620, is a name that is used in a communication to a human user, unless an alternative name is determined to be more significant than the first name. An alternative name is a name in the data structure that is subsequent to the first name, such as name2 in block 640, name3 in block 660, and name4 in block 680.

In some embodiments, populated data of data structure 600 is sorted in order of significance, in which a first name in the list is the most significant name in the list, and a last name in the list is the least significant. In some further embodiments of data structure 600, the order of significance is interstate names, U.S. highway names, state highway names county road names, and non-shielded names, of the thoroughfare.

In particular, the interstate names of the thoroughfare are populated in the data structure in an earlier position to the U.S. highway names of the thoroughfare. The U.S. highway names of the thoroughfare are populated in the data structure in an earlier position to the state highway names of the thoroughfare. The state highway names of the thoroughfare are populated in the data structure in an earlier position to the county road names of the thoroughfare. The county road names of the thoroughfare are populated in the data structure in an earlier position to the non-shielded names of the thoroughfare.

In some embodiments, data structure 600 includes an indication of the shield type for each of the names, such as shield_type_1 in block 610, shield_type_2 in block 630, shield_type_3 in block 650, shield_type_4 in block 670. Examples of shield types include interstate or non-interstate. In some embodiments, each shield type is a one character field in which a hexadecimal 1 represents an interstate, a hexadecimal 2 represents a U.S. highway, a hexadecimal 3 represents a state highway, a hexadecimal 4 represents a major highway, a hexadecimal 5 represents a principal highway, and a hexadecimal 6 represents another type of thoroughfare.

In some embodiments, data structure 600 is implemented as a record data structure. In varying embodiments, data structure 600 is implemented as one of a plurality of sequential records in a file, and/or linked nodes.

Data structure 600 provides at least one selectable better known or well-known name of a thoroughfare. Thus, data structure 600 is used to solve the problem in the prior art of identifying the thoroughfare by a lesser-known name.

Figure 7:
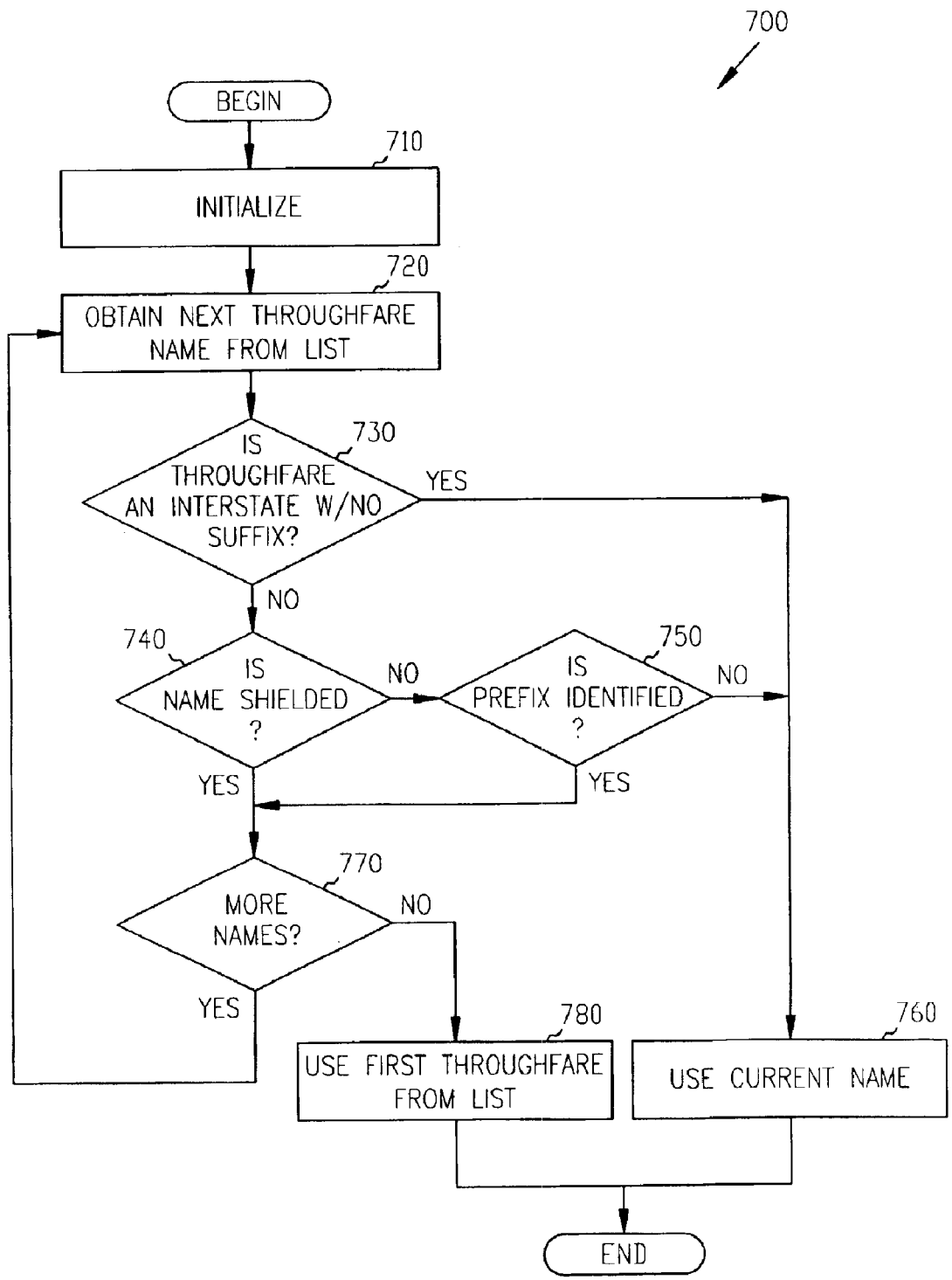
FIG. 7 is a flow diagram of a method of determining a name of a thoroughfare, according to an embodiment of the present invention.

FIG. 7 is a flow diagram of a method 700 of determining a name of a thoroughfare, according to an embodiment of the present invention. Method 700 begins by initializing a data structure that contains at least one name of a thoroughfare in block 710. In some embodiments, initializing includes identifying the first name in the list as the next name in the list. Method 700 is discussed in conjunction with data structure 600 above.

In some embodiments, the list is an instance of data structure 600 above, populated with data. One example of the first name is name1 in block 620 in data structure 600. In varying embodiments, the list is sorted dynamically, or the list sort order is predetermined before method 700 begins.

Thereafter, method 700 begins a loop that is performed until a determination is made that the best-known name on the list is the first name in the list, or that one of the alternative names in the list is the most suitable name. The loop includes blocks 720, 730, 740, 750, and 770. The loop begins with obtaining the next thoroughfare name from the list in block 720. During the first iteration of the loop, the next thoroughfare name is the first thoroughfare name in the list.

The shield types include interstates, U.S. highways, state highways, county roads, and/or city streets, any of which may or may not have a suffix and/or a prefix. A determination is made in block 730 as to whether the next thoroughfare name in data structure 600 indicates an interstate thoroughfare with no suffix. An example of an interstate thoroughfare name with no suffix is "I270." An example of an interstate thoroughfare name with a suffix is "I270 business." In some embodiments, the interstate determination in block 730 is made by comparing the shield type of the name, in data structure 600 in FIG. 6 to a hexadecimal 1. If the shield type associated with the name is an interstate with no suffix in the name, the name is identified in block 760 as the identifying name, or the label name of the thoroughfare that will be communicated for the thoroughfare, and the method ends. In some embodiments, the name is used when the thoroughfare is an interstate with no suffix in the name because the non-suffixed name for an interstate is most frequently the most well-known or renowned name for an interstate.

If the shield type of the name is not an interstate or the name of the thoroughfare contains a suffix in the name, then a determination of whether or not the thoroughfare name in the list is shielded is performed in block 740. In some embodiments, the shielded state of the name is determined by character string analysis well-known to those skilled in the art. In some embodiments, the shielded state of the name is determined by comparison of the shield type, (e.g. shield_type_1 in block 610 in FIG. 6), to a predetermined value.

If the name is not shielded, a determination as to whether the name has an identified prefix is made in block 750. An identified prefix is a substring that, when found at the start of a thoroughfare name, is an indication that the name is to be treated as a shielded name although it does not typically appear on a thoroughfare sign with a symbol. One example of an identified prefix is "CR" which indicates "county route." Another example of an identified prefix is "NF-" which indicates a "National Forest route." If the name does not have an identified prefix, it is selected or identified as the name that will be communicated for the thoroughfare in block 760, and method 700 ends.

In blocks 740 and 750, the name of a thoroughfare is used when the name is not shielded and not identifiably prefixed, because the name is likely to be substantially more well-known than a shielded name or a name with no identified prefix.

If the name is shielded, or the name is not shielded and a prefix is identified, then a determination as to whether or not more names exist in the list is made in block 770. If there are no more names in the list, then the first thoroughfare name in the list is identified as the name that will be communicated for the thoroughfare in block 780. However, if more names exist in the list, then the loop is reiterated. The names after the first name in the list can be, and are used, when those names are identified as likely being the most recognized, or "label," name.

In method 700, the first name in the list is selected as the name of the thoroughfare, unless an alternative name in the list after the first name indicates that the thoroughfare is an interstate with no suffix, or the name after the first name is not shielded and has no identified prefix, in which case, the alternative name is selected as the name of the thoroughfare.

Figure 8:
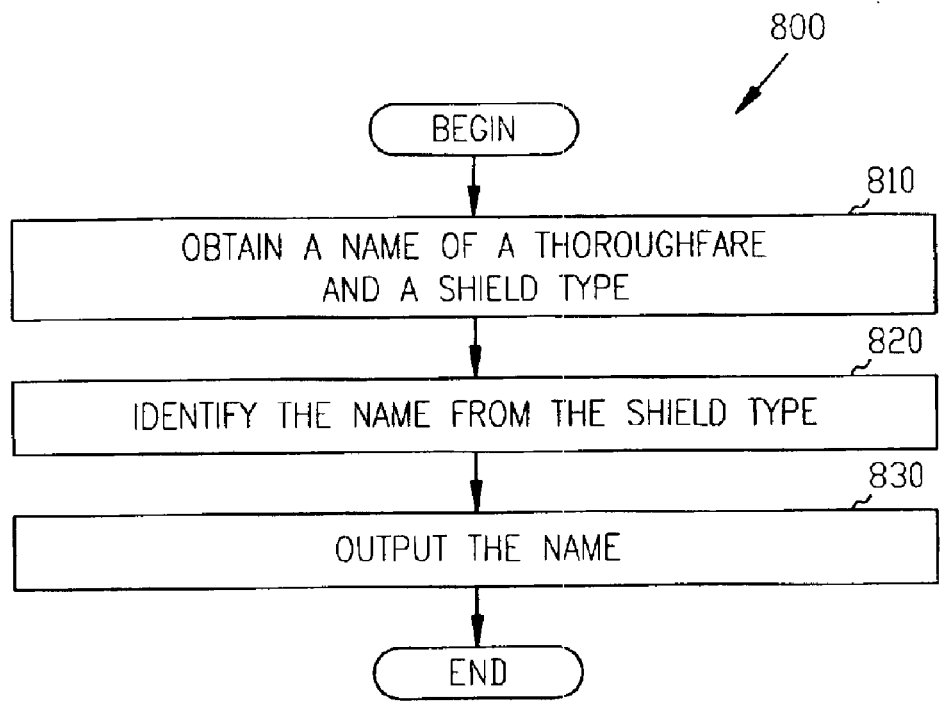
FIG. 8 is a flow diagram of a method of communicating cartographic information, according to an embodiment of the present invention.

FIG. 8 is a flow diagram of a method 800 of communicating cartographic information, according to an embodiment of the present invention. A name of a thoroughfare is obtained in block 810. In some embodiments, the thoroughfare name is also associated with a type of the shield of the name. The type of the shield of name is also known as a shield type. In some embodiments, the shield type is also obtained or determined. In some embodiments, the name type is a shielded type or a non-shielded type.

In block 820, a well-known name of the thoroughfare is identified as the label name in reference to the shield type. In varying embodiments, the identifying includes setting and/or determining the well-known name. Identifying, setting, or determining a well-known name solves the problem in the prior art of identifying a thoroughfare by a name that is not well-known, or that does not correspond to the name used on thoroughfare signs.

In some embodiments of the identifying in block 820 when the shield type of a name is an interstate and the name of the thoroughfare has no suffix, the identifying includes identifying that name from a plurality of names. The identified name is associated with the thoroughfare as the label name of the thoroughfare, if the shield type of the name is an interstate and the name of the thoroughfare has no suffix. In varying embodiments, the plurality of names is implemented as a list and/or a table, such as a database table.

In block 830, method 800 includes communicating the identified name to an output device. In some embodiments, the output device is a display and the communicating in block 830 includes displaying the identified name. In some embodiments, the output device is a voice unit and the communicating further includes audioizing the identified name, or a combination thereof. In some embodiments, the name is communicated through a display device, such as display screen 236 in FIG. 2, display screen 326 in FIG. 3, display screen 440 in FIG. 4, or display 524 in FIG. 5.

In some embodiments of method 800, the name is one from among a plurality of names in a list and/or a table, such as a database table. Method 800 is performed iteratively until the plurality of thoroughfares in the list is exhausted. In those embodiments, obtaining the name of a thoroughfare in block 810 also includes obtaining a name from a next thoroughfare in the plurality of names.

Figure 9:
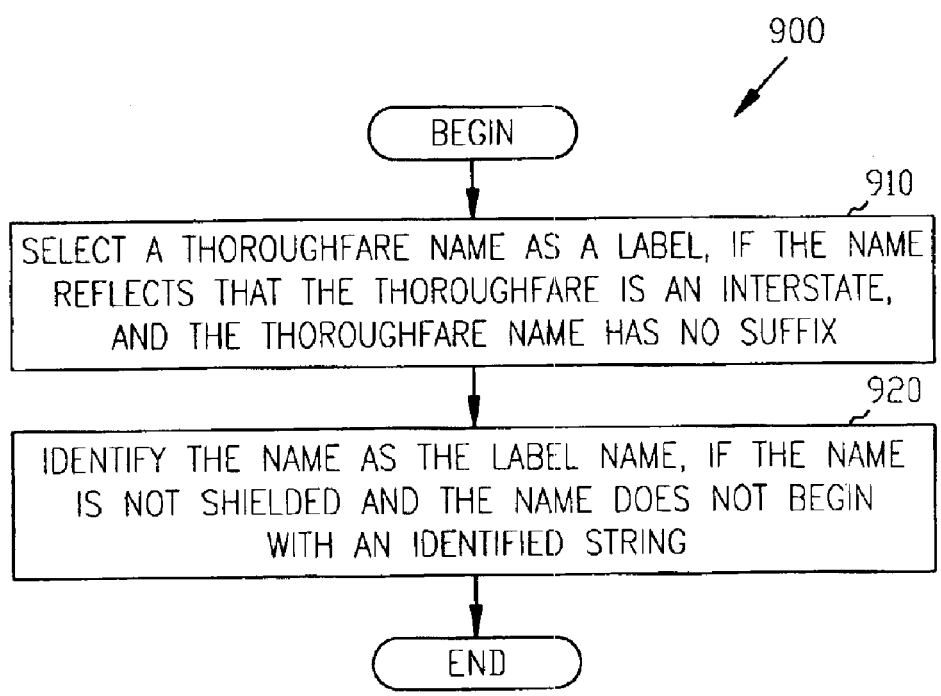
FIG. 9 is a flow diagram of a method of identifying a name of a thoroughfare, according to an embodiment of the invention.

FIG. 9 is a flow diagram of a method 900 of identifying a name of a thoroughfare, according to an embodiment of the invention. Method 900 is one embodiment of the identifying in block 820 in method 800. Method 900 uses a name in a list of names of the thoroughfare as a label of the thoroughfare in navigation data.

In block 910, method 900 includes selecting or identifying a name as a label name, where 1) the name reflects or indicates that the thoroughfare is an interstate, and 2) the thoroughfare name has no suffix. Table 1 below illustrates a combination of qualities embodied in block 910 wherein the-name will be used as the identifying label for a thoroughfare:

TABLE 1

|  | scenario 1 |
| --- | --- |
| example name | "I90" |
| interstate | ✓ |
| no suffix | ✓ |

In the example of scenario 1, the example thoroughfare name is "I90." In this example, the name does not have a suffix and the name reflects that the thoroughfare is an interstate. Therefore, the name "I90" is used to identify the thoroughfare. Block 910 is substantially similar to a "true" or a "yes" determination from block 730 in FIG. 7.

In block 920, method 900 also includes selecting or identifying a name as a label name where 1) the name is not shielded and 2) the name does not begin with an identified string. A beginning string is also known as a prefix. An example of a prefix is "CR" which represents "county road." In some embodiments, the criteria in block 920 also includes 3) the name reflecting that the thoroughfare is an interstate, or 4) the thoroughfare name having no suffix. Table 2 below illustrates three combinations of qualities embodied in block 920 wherein the name will be used as the identifying label for a thoroughfare:

TABLE 2

|  | scenario 1 | scenario 2 | scenario 3 |
| --- | --- | --- | --- |
| example name | "Jeff Davis Highway" | "Harry S. Darby business" | "Jeff Davis Highway business" |
| not an interstate | ✓ |  | ✓ |
| suffix |  | ✓ | ✓ |
| not shielded | ✓ | ✓ | ✓ |
| not beginning with an identified string | ✓ | ✓ | ✓ |

In each of the scenarios in table 2, the name is selected or identified as a label name. One example of scenario 1 is a name of "Jeff Davis Highway" where the thoroughfare is not an interstate, the name does not have a suffix, the name is not shielded, and the name does not begin with an identified string. One example of scenario 2 is "Harry S. Darby freeway business" where the name is an interstate and has a suffix (e.g. 'business'), the name is not shielded, and the name does not begin with an identified string. One example of scenario 3 is "Jeff Davis Highway business" where the thoroughfare is not an interstate, the name does have a suffix (e.g. 'business'), the name is not shielded, and the name does not begin with an identified string. Block 920 is substantially similar to blocks 740 and 750 in FIG. 7.

In some embodiments, methods 700–900 are implemented as a computer data signal embodied in a carrier wave, that represents a sequence of instructions which, when executed by a processor, such as processor 410 in FIG. 4A, processor 436 in FIG. 4B, or processor 504 in FIG. 5, cause the processor to perform the respective method. In other embodiments, methods 700–900 are implemented as a computer-accessible medium, such as memory 430 in FIG. 4A, memory 442 in FIG. 4B or memory 506 in FIG. 5, having executable instructions capable of directing a processor, such as processor 410 in FIG. 4A, processor 436 in FIG. 4B, or processor 504 in FIG. 5, respectively, to perform the respective method. In varying embodiments, the medium is a magnetic medium, an electronic medium, or an optical medium.

As one of ordinary skill in the art will understand upon reading this disclosure, the electronic components shown in FIGS. 4A and 4B and system components shown in FIG. 5 can be embodied as computer hardware circuitry or as a computer-readable program, or a combination of both.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to selecting a best-known or well-known name in cartographic data.

Systems and methods are provided that identify a name of a thoroughfare from at least one name for the thoroughfare in reference to a set of criteria. In one example, the set of criteria includes whether or not the thoroughfare is an interstate, whether or not a name is shielded, has a suffix, and/or has an identified prefix. Interstate thoroughfares are often identified by a shielded name of the interstate thoroughfare, and non-interstate thoroughfares are often identified by a non-shielded name of the non-interstate thoroughfare. The identified name includes a name which is most recognized or well-known for navigating.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. A personal digital assistant (PDA) to identify a name of a thoroughfare comprising:
   a calendar function;
   an address book function;
   a memory having one or more names of a thoroughfare; and
   a processor to communicate with the memory, the processor is to identify a well-known name of the thoroughfare from among the one or more names based on a set of criteria, the set of criteria includes a name of the throroughfare and a shield type of the thoroughfare.

2. The PDA of claim 1, wherein the shield type is selected from a group of types consisting of a shielded type and a non-shielded type.

3. The PDA of claim 1, wherein the memory includes a plurality of thoroughfares, and the memory includes at least one name for each of a plurality of thoroughfares.

4. The PDA of claim 1, wherein the processor is to identify a first name of the one or more names when none of the names in the one or more names satisfies the set of criteria.

5. The PDA of claim 1, wherein the processor is to identify an alternative name to a shielded name when the thoroughfare is an interstate having a suffix.

6. The PDA of claim 1, wherein the set of criteria includes an interstate name having no suffix.

7. The PDA of claim 1, wherein the set of criteria includes a non-interstate name or a name having no suffix, and the name having a non-shielded type and having an identified prefix.

8. The PDA of claim 1, wherein the processor is operable to communicate the identified name to a display of the PDA.

9. The PDA of claim 1, wherein the PDA includes a telecommunication functionality operable for transmitting and receiving voice data.

10. The PDA of claim 1, wherein the PDA includes a Bluetooth capability.

11. The PDA of claim 1, wherein the PDA includes an audio interface operable to audibly communicate the identified name.

12. A handheld multifunction device to communicate navigation information, comprising:
   a calendar function;
   an address book function;
   a processor operably coupled to a display and a memory, the memory having cartographic data for a plurality of thoroughfares, and a plurality of thoroughfare label data stored therein, the plurality of thoroughfare label data including data indicative of a well-known name for a thoroughfare associated with the cartographic data; and
   wherein the processor is operable to identify a well-known name of the thoroughfare in reference to a name of the thoroughfare and a shield type of the thoroughfare.

13. The device of claim 12, wherein the display includes an audio interface and a voice synthesis unit.

14. The device of claim 12, wherein the shield type of the thoroughfare includes data indicative of interstates, U.S. highways, state highways, county roads, and city streets.

15. A method of identifying a name of a thoroughfare, comprising:
   in a PDA, obtaining one or more names of the thoroughfare, the one or more names of the thoroughfare including a shield type and a number of alternative names; and
   selecting a better-known name as a label name for the thoroughfare in reference to the shield type and the number of alternative names.

16. The method of claim 15, wherein the selecting includes:
   selecting a shield name as the label name if the shield type indicates that the thoroughfare is an interstate and the shield name has no suffix.

17. The method of claim 16, wherein the selecting includes:
   selecting a non-shield name as the label name if the shield type indicates that the thoroughfare is an interstate, and the name of the thoroughfare has a suffix;
   selecting a non-shield name as the label name if the shield type indicates that the thoroughfare is not an interstate; and
   selecting an alternative name as the label name if the shield type indicates that the name of the thoroughfare begins with an identified string.

18. The method of claim 15, wherein the obtaining includes:
   obtaining a next name from the one or more names of the thoroughfare and the method is iteratively performed until a label name is selected in reference to the shield type and the number of alternative names.

19. The method of claim 18, wherein the method is being performed for the first iteration and the next name from the one or more names of the thoroughfare includes a first name.

20. The method of claim 15, wherein the method includes communicating the selected label name to a display of the PDA.

21. The method of claim 20, wherein the display includes a voice synthesis unit and the communicating includes communicating the selected label name to the display in an audible format.

22. A PDA system for selecting a well-known name of a thoroughfare, comprising:
   a server having a processor and a memory, the memory having navigation data, the navigation data including data indicative of a name of the thoroughfare and a shield type of the name of the thoroughfare;
   wherein the server includes executable instructions stored thereon, the processor operable on the executable instructions to:
   identify a well-known name of the thoroughfare in reference to the name of the thoroughfare and the shield type of the name of the thoroughfare.

23. The PDA system of claim 22, wherein the system includes:
   a PDA operable to communicate with, and retrieve, navigation data from the server via a communication channel, wherein the PDA includes a display operable to display the well-known name.

24. The PDA system of claim 22, wherein the system further includes a voice synthesis unit operable to communicate the well-known name.

25. The PDA system of claim 23, wherein the communication channel includes a wireless channel.

26. The PDA system of claim 23, wherein the system includes a data storage operable to store navigation data.

27. The PDA system of claim 23, wherein the server includes a processor operable to respond to a request from the PDA by performing calculations on the navigation data and transmitting results to the PDA.

28. The PDA system of claim 27, wherein the PDA is operable to communicate with and retrieve navigation data from the server using a Bluetooth technology.

29. The PDA system of claim 22, wherein the set of executable instructions further include instructions for:

identifying a first name in a plurality of names associated with the thoroughfare as the well-known name, if the shield type of the name indicates that the thoroughfare is not an interstate or the name of the thoroughfare has a suffix, and the name is shielded and the plurality of names associated with the thoroughfare is exhausted, or the name is not shielded and the name begins with an identified string and the plurality of names associated with the thoroughfare is exhausted.

30. The PDA system of claim 22, wherein the set of executable instructions further include instructions for:

identifying a name in a plurality of names associated with the thoroughfare as the well-known name, if the name of the thoroughfare has no suffix and the shield type of the thoroughfare reflects that the thoroughfare is an interstate.

31. The PDA system of claim 22, wherein the set of executable instructions further include instructions for:

obtaining iteratively a next name from a plurality of thoroughfare names until the plurality of thoroughfare names is exhausted.

* * * * *